United States Patent
Ishimatsu et al.

[15] 3,692,294
[45] Sept. 19, 1972

[54] APPARATUS FOR PRODUCTION OF ZIRCONIUM METAL

[72] Inventors: Kazuhiko Ishimatsu; Takao Nakahara, both of Tokyo, Japan

[73] Assignee: Nippon Mining Co., Ltd., Tokyo, Japan

[22] Filed: Feb. 16, 1971

[21] Appl. No.: 115,267

[52] U.S. Cl. ............................266/34 R, 75/84.5
[51] Int. Cl. ...........................................C22b 61/02
[58] Field of Search.....266/34 R, 34 T, 34 V, 29, 15, 266/26, 34 A; 75/84.4, 84.5

[56] References Cited

UNITED STATES PATENTS

| | | | |
|---|---|---|---|
| 2,205,854 | 6/1940 | Kroll | 75/84.5 |
| 2,427,338 | 9/1947 | Alexander | 75/84.5 |
| 2,787,539 | 4/1957 | Conklin | 75/84.5 |
| 2,828,201 | 3/1958 | Findlay | 75/84.4 |
| 1,594,348 | 8/1926 | Bakken | 266/15 |
| 2,158,517 | 5/1939 | McParlin | 266/34 A |
| 3,443,253 | 6/1948 | Kroll | 75/84.5 |

*Primary Examiner*—J. Spencer Overholser
*Assistant Examiner*—John S. Brown
*Attorney*—Sughrue, Rothwell, Mion, Zinn & Macpeak

[57] ABSTRACT

In an apparatus adapted for the production of zirconium metal, by the reduction of zirconium tetrachloride with metallic magnesium with magnesium chloride being formed as a by-product, comprising a reaction vessel provided with means allowing for the introduction of zirconium tetrachloride vapor into said reaction vessel, a pressure control valve and means allowing for the introduction to and exhaustion from said reaction vessel of a gas, and an outer vessel surrounding said reaction vessel defining an annular space therebetween, the improvement which comprises a first means communicating between the interior of said reaction vessel and said annular space allowing for the discharge of said by-product magnesium chloride from the interior of said reaction vessel to said annular space and a second means communicating between said annular space and outside of said outer vessel allowing for the discharge of said by-product magnesium chloride from said annular space.

10 Claims, 7 Drawing Figures

PATENTED SEP 19 1972　　　　　　　　　　　　　　3,692,294
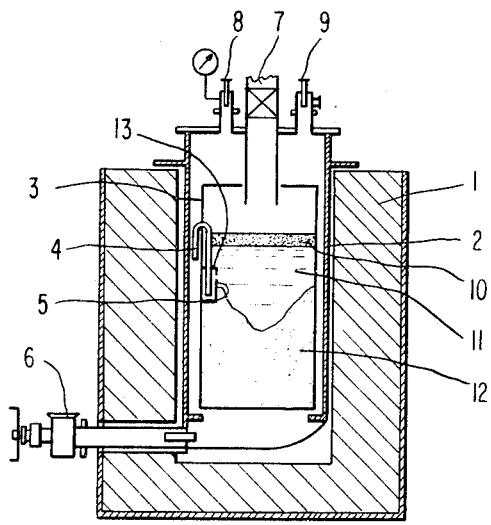
FIG. I
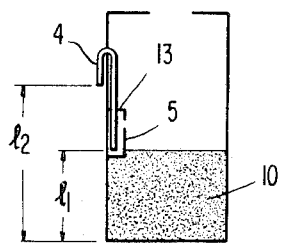  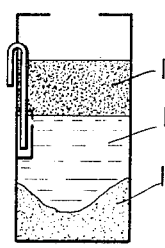  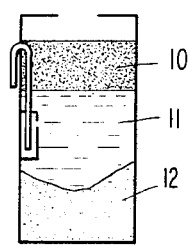  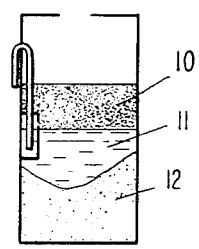
FIG. 2A　　FIG. 2B　　FIG. 2C　　FIG. 2D
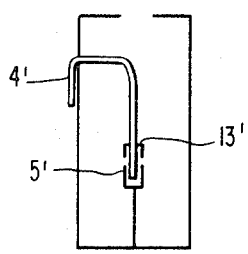  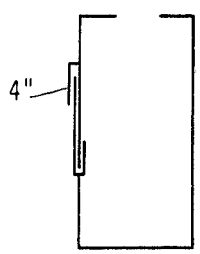
FIG. 3A　　FIG. 3B
INVENTORS
KAZUHIKO ISHIMATSU
TAKAO NAKAHARA
BY Sughrue, Rothwell, Mion,
　　　Zinn & Macpeak
ATTORNEYS

3,692,294

APPARATUS FOR PRODUCTION OF ZIRCONIUM METAL

BACKGROUND OF THE INVENTION

1. Field of the Invention

This invention relates to a reaction apparatus for use in the production of metallic zirconium by the so-called Kroll's process, which process comprises reducing zirconium with metallic magnesium.

2. Description of the Prior Art

Heretofore, industrial-scale production of metallic zirconium has been carried out by a process which involves reducing high purity zirconium tetrachloride with metallic magnesium in an inert atmosphere at a high temperature, for example 750° C to 900° C. in the practice of this process, an apparatus comprising an outer vessel and an inner vessel is used for effecting the reduction reaction. Magnesium metal is melted within the inner vessel, and reacted with a gas of zirconium tetrachloride introduced from the outside of the vessel, thereby producing zirconium metal and magnesium chloride in the inner vessel. The crude product is then transferred to another furnace, where magnesium chloride and unreacted magnesium metal are removed from the resulting metallic zirconium sponge by vaporization in a high vacuum at a high temperature to recover zirconium metal.

Several conventional types of apparatus for producing zirconium metal are known; for example, one type comprises a crucible-type inner vessel placed within an outer vessel, in which the reaction product completely fills the inner vessel and is cooled in this state, and then the inner vessel containing the cooled product is withdrawn and transferred to the subsequent step of separating magnesium chloride.

A second type of apparatus comprises an inner vessel having a perforated disc at the lower portion thereof and an outer vessel having a valve at the side of the bottom thereof for discharging magnesium chloride, in which a sponge of metallic zirconium resulting from the reaction is allowed to stay within the inner vessel, and magnesium chloride is allowed to flow to the bottom through the perforated disc provided at the lower part of the inner vessel and is discharged out of the vessel by the discharge valve during or after the reaction.

A third type of apparatus comprises an inner vessel having at its intermediate portion a valve for discharging magnesium chloride and an outer vessel compartment having at its lower part the same valve, in which a part of the molten magnesium chloride in an intermediate layer of the reaction product is discharged out of the inner vessel during or after the reaction.

However, these types of known apparatus are disadvantageous in several respects. For example, in the apparatus employing a crucible-type inner vessel as mentioned above, the amount of metallic zirconium sponge produced per batch is determined according to the inner volume of the inner vessel. The amount of magnesium chloride formed as by-product in Kroll's process reduction can be as much as about eight times the volume of the resulting metallic zirconium sponge. This is extremely inefficient, and a large-sized separating apparatus is needed to remove magnesium chloride from the resulting metallic zirconium in a high vacuum at a high temperature. The second type of apparatus described above, on the other hand, has been found inadequate for industrial-scale production since the resulting metallic zirconium sponge, being semi-flowable, flows downward through the perforated disc. In the case of the third type of apparatus described above, it is extremely difficult, both structurally and operationally, to open and close the valve provided at the intermediate part of the inner vessel.

Accordingly, an object of the present invention is to provide an apparatus useful for producing metallic zirconium by the method of reducing zirconium tetrachloride with metallic magnesium, which is capable of yielding metallic zirconium in a greatly increased amount per unit volume of reaction vessel.

SUMMARY OF THE INVENTION

This object is achieved by means of the apparatus of the present invention which generally comprises a reaction vessel and a casing enclosing the vessel and includes a siphon-shaped passage communicating between the reaction vessel and the surrounding casing for discharging only magnesium chloride formed during the reaction out of the reaction vessel, either intermittently or continuously, throughout the progress of the reaction.

BRIEF DESCRIPTION OF THE DRAWINGS

FIG. 1 is a vertical sectional view of the apparatus of the present invention;

FIGS. 2A through 2D are views showing the changes in levels of the layers of substances present in the reaction vessel as shown in FIG. 1; and FIGS. 3A and 3B are vertical sectional views of the reaction vessel of the present invention illustrating other embodiments of the communicating passage for discharging magnesium chloride.

DESCRIPTION OF THE PREFERRED EMBODIMENTS

The primary characteristic of the apparatus of the present invention is the provision of the siphon-like passage communicating between within the reaction vessel and without it, that is, to the annular space defined by the reaction vessel and the casing surrounding the vessel. Initially, before the start of the reaction, metallic magnesium is charged into the bottom of the reaction vessel. The reaction is commenced by injecting zirconium tetrachloride vapor into the vessel. As the reaction proceeds, three distinct layers are formed: a lowermost layer of zirconium sponge (reference numeral 12 in FIG. 2B), an intermediate layer of by-product magnesium chloride (reference numeral 11 in FIG. 2B), and an uppermost layer of metallic magnesium (reference numeral 10 in FIG. 2B). As more zirconium is formed, the interface between layers 10 and 11 tends to move upwardly in the vessel.

The height of each opening of the communicating passage is determined according to such factors as the amount of magnesium metal to be fed into the reaction apparatus or the bottom area of the reaction apparatus, but is generally determined in the following manner.

One end of the communicating passage opens into the inside of the lower part of the reaction vessel. The communicating passage extends upwardly from this opening, curves (i.e., the direction changes by substantially 180°), and then extends downwardly to another opening which is outside of the reaction vessel and is located at a position higher than the first-mentioned opening. In addition, these openings are provided at heights $l_1$ and $l_2$, respectively, such that when the height of a layer 10 of magnesium metal is at a height higher than the uppermost part of the communicating passage during the reaction of zirconium tetrachloride with magnesium metal, a layer of magnesium chloride 11, formed as a by-product, is present at the height of the lower opening of the passage; and the upper opening of the passage is at a height such as to prevent the out-flow of magnesium chloride from the vessel before the level of the magnesium layer 10 reaches the height of the lower opening, when a part of the magnesium chloride layer flows out of the vessel through the communicating passage and the interface between the magnesium layer and the magnesium chloride layer thus comes down within the vessel.

Referring now to FIG. 1, reference numeral 1 represents a heating furnace; 2, an outer vessel, 3, an inner vessel which constitutes a reaction vessel for performing the reduction; 4, a communicating passage provided in the inner vessel for discharging magnesium chloride; 5, a stopper for preventing the inflow of unreacted magnesium metal into the communicating passage; 6, a valve for discharging magnesium chloride from the outer vessel; 7, an inlet for the introduction of zirconium tetrachloride vapor; 8, a pressure control valve; 9, a valve for evacuating the reactor and for introducing an inert gas such as argon; 10, a layer of unreacted magnesium metal; 11, a layer of magnesium chloride; and 12, a layer of metallic zirconium sponge.

In operation, metallic magnesium is first charged into the reactor, and the reactor is maintained air-tight. After the inner and outer vessels are evacuated by means of the evacuating valve 9, an inert gas such as argon is introduced through valve 9 into the vessel. Then the inner vessel 4 is heated to a high temperature to melt the magnesium metal, and thereafter, zirconium tetrachloride vapor is introduced into the vessel through inlet pipe 7.

The reducing reaction of the zirconium tetrachloride is performed on the surface of the metallic magnesium, thereby forming metallic zirconium and magnesium chloride. The metallic zirconium constitutes the lowermost layer 12, magnesium chloride the intermediate layer 11, and unreacted magnesium metal the uppermost layer 10. With the progress of the reaction, the levels of the layers 12 and 11 gradually rise and, therefore, the surface of the layer 10 becomes higher towards the upper portion of the inner vessel.

Changes in the levels of the three layers in the inner vessel which occur with the progress of the reaction, and during the extracting or discharging of magnesium chloride, will be described with reference to FIGS. 2A–2D. Magnesium metal is first melted, and the reaction begins in the condition shown in FIG. 2A. With the progress of the reaction, the metallic magnesium layer 10 is gradually consumed and reduced in thickness, whereas the magnesium chloride layer 11 and the metallic zirconium layer 12 gradually move upwards, as shown in FIGS. 2B and 2C.

When the level of the metallic magnesium layer reaches the upper end of the communicating passage as shown in FIG. 2C, the magnesium chloride layer 11 begins to flow out of the inner vessel through the passage. If at this time, there is a proper rise of the level or there is a slight difference in pressure between the inner and outer vessel, a siphonic phenomenon occurs and causes only the intermediate layer of magnesium chloride to flow out of the inner vessel, resulting in the state shown in FIG. 2D. Thereafter, the level of the magnesium again rises to the position shown in FIG. 2C with the progress of the reaction, and the foregoing change is repeated. When a rise in the level is very slow in FIG. 2C, magnesium chloride increasing in amount with the progress of the reaction is always caused to flow out of the inner vessel through the communicating passage while the level is being maintained substantially constant.

The magnesium chloride, which has flowed into the space between the inner vessel 3 and the outer vessel 2, then comes down to the lower part of the outer vessel 2, and is then discharged out of the outer vessel through valve 6 secured to the outer vessel 2.

If magnesium metal flows into the inside of the communicating passage 4, it will react with zirconium tetrachloride vapor to form a metallic zirconium sponge which may result in the blockage of the passage and make it difficult for magnesium chloride to flow therethrough. Care must be taken, therefore, to avoid this. Such blockage would be avoided if the lower opening of the communicating passage is closed by some means when the magnesium metal layer rises above this opening. The most suitable method that can be used in the present invention for this purpose will be described below.

Specifically, this consists in the provision of stopper 5 at the opening of the communicating passage in the inner vessel 3. A substance which is flowable at the reaction temperature, immiscible with magnesium metal, and inert to the reaction, and which has a specific gravity greater than that of magnesium, is put into stopper 5 to a depth such that the opening of the communicating passage is submerged therein. Generally, it is most convenient and economical to charge magnesium chloride, resulting from the reducing reaction as a by-product, into the stopper, and magnesium chloride is used in the embodiment described below.

Since the inside of the stopper is filled beforehand with magnesium chloride, even when the level of the metallic magnesium layer rises as shown in FIG. 2B, metallic magnesium cannot flow into the communicating passage; accordingly, the formation of metallic zirconium sponge does not occur in the communicating passage.

A cover shown at 13 or 13′ may be provided above the stopper 5 in order to prevent the in-flow into the stopper of zirconium metal which has resulted from the reaction and is descending within the vessel from above.

Other embodiments of the communicating passage 4, to be provided in inner vessel 3, are shown in FIGS. 3A and 3B. In FIG. 3A, a stopper 5′, for communicating passage 4′, is placed at the center of the reactor; and in FIG. 2B, a pocket-like communicating passage 4″ is formed in the wall of the reactor.

When the reaction apparatus of the present invention is used, the conventional procedure for the production of zirconium metal by Kroll's process can be directly applied.

Thus, the reducing reaction of zirconium tetrachloride with magnesium metal can be continuously performed within a certain area of the reactor on the basis of a communicating passage pre-designed as described above. The reaction apparatus of the present invention allows for the production of larger amounts of metallic zirconium within a certain constant volume of reactor than in the case of using the conventional crucible-type reactor. Furthermore, there is a lesser amount of magnesium chloride remaining in the reactor after the end of the reaction because most of the resulting magnesium chloride is discharged in the molten state. Hence, the cost of separating magnesium chloride from the metallic zirconium sponge in the subsequent step can be reduced.

The use of the reaction apparatus of the present invention brings about further advantages. Unlike the conventional apparatus of the second type described hereinabove which includes a perforated disc at the bottom of the inner vessel, the apparatus of the present invention does not allow any loss of the resulting metallic zirconium owing to flow-out. On the other hand, in the conventional apparatus described hereinabove which includes a valve in the intermediate part of the inner vessel, only a part of the magnesium chloride is removed after the end of the reaction in actual operation, but the apparatus of the present invention is of relatively simple construction. In addition, it hardly requires labor except in removing magnesium chloride from the outer vessel to the outside of the apparatus, and the amount of metallic zirconium to be obtained from one batch can be increased.

The production of metallic zirconium sponge by Kroll's process is now being carried out by the batch process, and the weight of the metallic zirconium to be obtained per batch constitutes one of the greatest factors which affect the cost of production. The reaction apparatus of the present invention can readily yield twice as much metallic zirconium as would be obtained with the crucible-type apparatus having the same volume. The time required to attain such a yield represents only a 5 percent increase over that required with the crucible-type apparatus in terms of total time, including the heating and cooling time in the reducing step. Moreover, even when the amount of the resulting metallic zirconium is doubled, the number of treating steps hardly changes.

In short, the advantages of the present invention lead to a marked increase in efficiency as compared with the conventional types of apparatus due not only to an extreme increase in the yield of metallic zirconium with a reducing reactor of the same volume, but also to a reduction in the time for treating it per unit weight thereof or in the number of treating steps.

The present invention is further illustrated by the following non-limiting example.

EXAMPLE

The apparatus used was of the type shown in FIG. 1 including a crucible-type reactor having an inner diameter of 45 cm and a height of 75 cm, at the intermediate portion of which was fitted a magnesium chloride outlet having an inner diameter of 1 cm and a length of 38 cm along the vertical direction of the reactor. Magnesium metal was charged into the reactor, and magnesium chloride into the stopper. The reactor was sealed and evacuated, and then argon was introduced thereinto. The reactor was heated externally to melt the magnesium metal. Zirconium tetrachloride vapor was then charged into the inner vessel. The reaction of zirconium tetrachloride with magnesium metal was performed at about 800° C to produce zirconium metal and magnesium chloride. With a rise in the level of the bath within the reactor, a part of the magnesium chloride formed as a by-product was caused to flow intermittently or continuously out of the vessel. The magnesium chloride was then discharged out of the apparatus through the valve fitted to the bottom of the outer vessel.

The reduction of zirconium tetrachloride with metallic magnesium was then performed under the same conditions as above using a crucible-type inner vessel of the same size as the reducing reactor used above which did not have the present communicating passage for discharging the magnesium chloride.

The results obtained are shown in the table below. The values shown in the table are arithmetic means of the measured values obtained in three repeated experiments.

| | Method of the invention | Method using a crucible-type inner compartment |
|---|---|---|
| Amount charged (Kgs) | | |
|   Magnesium metal | 140 | 67 |
|   Zirconium tetra-chloride | 377 | 250 |
| Amount of zirconium metal produced (Kgs) | 143 | 70 |
| Amount of magnesium chloride discharged (Kgs) | 180 | 0 |
| Treating time (hours) | | |
|   Material charging and evacuation | 7.5 | 8 |
|   Heating | 12.5 | 12 |
|   Reaction | 13 | 10 |
|   Cooling and withdrawing | 24 | 24 |
| Number of treating steps | 9 | 9 |

It is seen from the results shown in the table that the weight of the metallic zirconium sponge obtained using the apparatus of the present invention was more than doubled compared to the case of using a reaction vessel of the same size but without the passage of the present invention, in spite of the fact that there was hardly any difference in the treating times and the number of treating steps. Since magnesium chloride formed as a by-product is discharged in accordance with the method employing the apparatus of the present invention, there is less amount of magnesium chloride remaining in the reducing reactor, and this makes it possible to reduce the cost needed for separating it from the metallic zirconium sponge in the subsequent step.

We claim:

1. In an apparatus adapted for the production of zirconium metal, by the reduction of zirconium tetrachloride with metallic magnesium with magnesium chloride being formed as a by-product, comprising a reaction vessel provided with means allowing for the introduction of zirconium tetrachloride vapor into said reaction vessel, a pressure control valve and means allowing for the introduction to and exhaustion from said reaction vessel of a gas, and an outer vessel surrounding said reaction vessel defining an annular space therebetween, the improvement which comprises a first means communicating between the interior of said reaction vessel and said annular space allowing for the discharge of said by-product magnesium chloride from the interior of said reaction vessel to said annular space and a second means communicating between said annular space and outside of said outer vessel allowing for the discharge of said by-product magnesium chloride from said annular space.

2. The apparatus of claim 1 wherein said first means comprises a siphon-shaped passage having a first opening in said reaction vessel and a second opening in said annular space.

3. The apparatus according to claim 2, wherein said first opening opens into the inside of the lower part of said reaction vessel; wherein said passage extends upwardly from said first opening, curves substantially 180°, and then extends downwardly to said second opening, said second opening being higher relative to said first opening; wherein both openings are provided at heights such that when a layer of magnesium metal formed during the reduction is at a height higher than the uppermost part of said passage during the reduction of zirconium tetrachloride with magnesium metal, a layer of said by-product magnesium chloride is present about said first opening; and wherein said second opening is at a height such as to prevent the outflow of magnesium chloride from the reaction vessel before the magnesium metal layer reaches said first opening.

4. The apparatus according to claim 3, wherein a third means is provided at said first opening to prevent the in-flow of magnesium metal into said passage, said third means containing a substance which is flowable at the reaction temperature, immiscible with magnesium metal and inert to the reaction and has a specific gravity greater than that of magnesium metal, to a depth such that said first opening is submerged in said substance.

5. The apparatus according to claim 4, wherein said substance is magnesium chloride.

6. The apparatus according to claim 4, wherein a fourth means is provided above said third means in order to prevent the in-flow into said third means of zirconium metal which has resulted from the reduction and is descending in said reaction vessel.

7. The apparatus according to claim 6, wherein said passage is formed in a wall of said reaction vessel.

8. The apparatus according to claim 6, wherein said third means is disposed in the center of said reaction vessel.

9. The apparatus according to claim 1, wherein said second means comprises a valve.

10. The apparatus according to claim 1 further comprising a heating means.

* * * * *